(12) United States Patent
Kostov et al.

(10) Patent No.: US 10,453,165 B1
(45) Date of Patent: Oct. 22, 2019

(54) COMPUTER VISION MACHINE LEARNING MODEL EXECUTION SERVICE

(71) Applicant: Amazon Technologies, Inc., Seattle, WA (US)

(72) Inventors: Anton Kostov, Seattle, WA (US); Yi Sun, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 227 days.

(21) Appl. No.: 15/470,611

(22) Filed: Mar. 27, 2017

Related U.S. Application Data

(60) Provisional application No. 62/464,320, filed on Feb. 27, 2017.

(51) Int. Cl.

| | | |
|---|---|---|
| *G06K 9/00* | (2006.01) | |
| *G06T 1/20* | (2006.01) | |
| *G06T 7/10* | (2017.01) | |
| *G06K 9/46* | (2006.01) | |
| *G06N 20/00* | (2019.01) | |
| *G06K 9/36* | (2006.01) | |
| *G06T 7/143* | (2017.01) | |
| *G06T 7/149* | (2017.01) | |

(52) U.S. Cl.
CPC .................. *G06T 1/20* (2013.01); *G06K 9/46* (2013.01); *G06N 20/00* (2019.01); *G06T 7/10* (2017.01); *G06K 2009/366* (2013.01); *G06T 7/143* (2017.01); *G06T 7/149* (2017.01)

(58) Field of Classification Search
CPC . G06T 1/20; G06T 7/10; G06N 20/00; G06K 9/46
USPC .......................................................... 382/159
See application file for complete search history.

(56) References Cited

U.S. PATENT DOCUMENTS

| | | | |
|---|---|---|---|
| 8,965,104 B1 * | 2/2015 | Hickman ................... | G06T 7/00 382/153 |
| 9,465,994 B1 * | 10/2016 | Mishra ..................... | H04N 5/77 |
| 2014/0270494 A1 * | 9/2014 | Sawhney .......... | G06K 9/00979 382/159 |
| 2017/0308656 A1 * | 10/2017 | Petkov .................... | G06T 15/08 |
| 2017/0308773 A1 * | 10/2017 | Miyazaki ............. | G06K 9/6256 |

* cited by examiner

*Primary Examiner* — Van D Huynh
(74) *Attorney, Agent, or Firm* — Knobbe, Martens, Olson & Bear, LLP

(57) ABSTRACT

Systems and methods are provided for implementing a computer vision model execution service. A computer vision model execution service may maintain a library of machine learning models, and may provide a standard interface for accessing a model or models. Models may implement schemas that specify an input vector and an output vector, and the computer vision model execution service may obtain or determine workflows that process input vectors through multiple computer vision models. The service further provides an interface for adding, removing, or updating models, and may provide feedback to modelers regarding the usage and performance of various machine learning models.

20 Claims, 8 Drawing Sheets

COMPUTER VISION MACHINE LEARNING MODEL
trained to recognize FURNITURE

160 — Model identifier: <identifier #1>

170 — Accepts inputs:

| NAME | TYPE | VALIDATION |
|---|---|---|
| "Title" | text | text/plain; charset=utf-8 |
| "Description" | text | text/plain; charset=utf-8 |
| "Price" | numeric | min: 0; max: 9999 |
| "Image" | image | image/png |

172A, 172B, 172C, 172D

180 — Provides outputs:

| NAME | TYPE | VALIDATION |
|---|---|---|
| "Style" | enumerated | Traditional | Modern | ... |
| "Category" | enumerated | Home | Office | ... |
| "Approval probability" | numeric | min: 0.0; max: 1.0 |

COMPUTER VISION MACHINE LEARNING MODEL EXECUTION SERVICE

CROSS-REFERENCE TO RELATED APPLICATIONS

This application claims the benefit of U.S. Provisional Application No. 62/464,320, entitled COMPUTER VISION MACHINE LEARNING MODEL EXECUTION SERVICE, and filed Feb. 27, 2017, the entirety of which is hereby incorporated by reference herein.

BACKGROUND

Generally described, computing devices may utilize machine learning models to process visual information. Machine learning models may be trained to recognize and/or classify images by providing a set of known inputs (e.g., sample images and other data) and desired outputs. The model may thereby be trained to formulate general rules for classifying images, and may classify new images or provide other outputs according to its learned rules. Machine learning models may also be trained using techniques such as reinforced learning (e.g., providing positive or negative feedback in response to an output), or may be used without output-based training to identify unknown patterns in the input data, such as a previously unknown relationship between the inputs. The results (outputs) produced by a machine learning model may thus vary according to the inputs and the techniques used to train the model, as well as the characteristics of the machine learning model itself.

A user of computer vision machine learning models may thus be faced with a multitude of models, each of which may be more or less effective when used in particular applications or with particular inputs, and each of which may require different inputs and provide different outputs.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 3A is a block diagram of an illustrative computer vision machine learning model schema, which specifies an input vector that the model receives and an output vector that the model provides in accordance with aspects of the present disclosure.

DETAILED DESCRIPTION

Figure 1A:
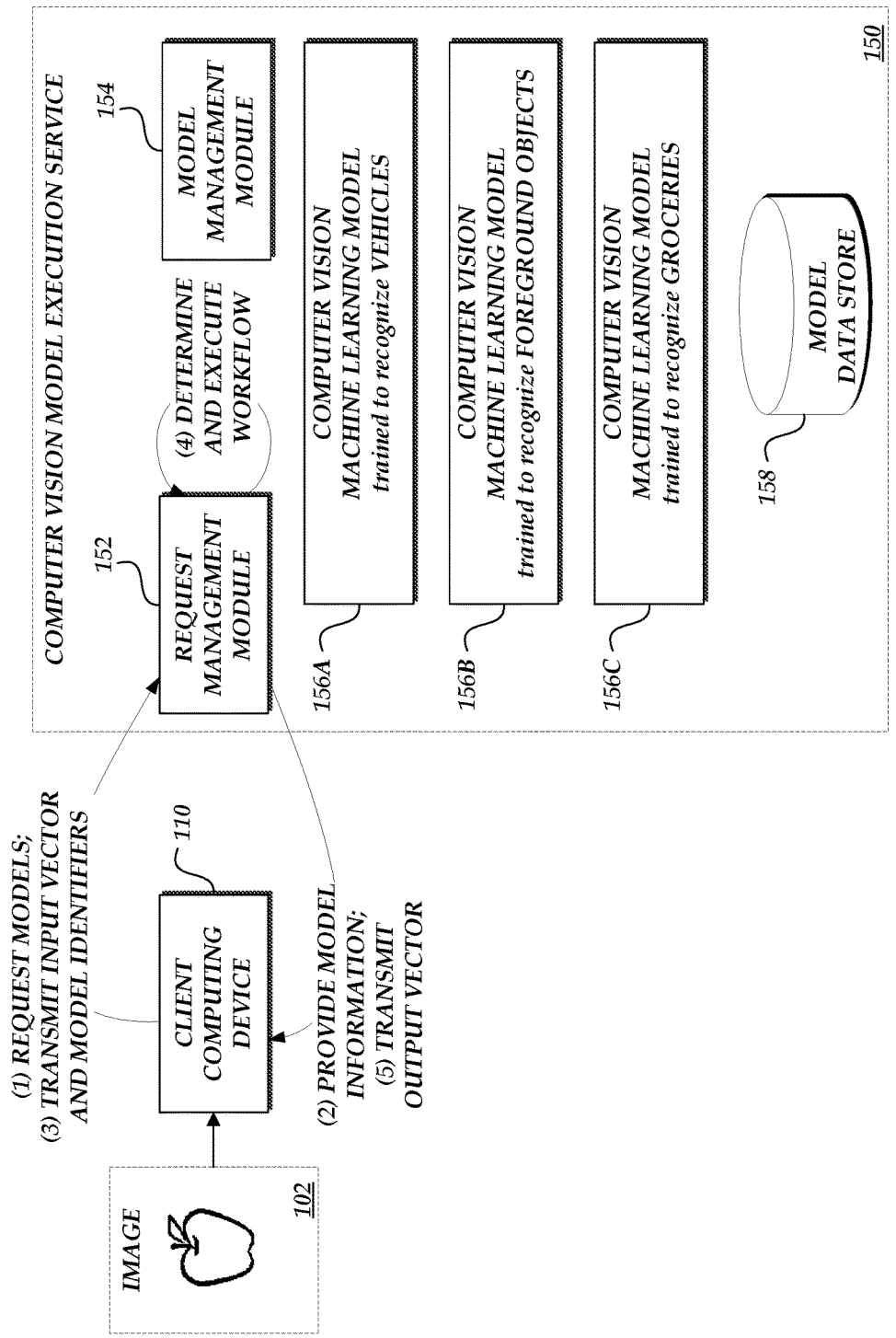
FIG. 1A is a state diagram that depicts a client computing device interacting with a computer vision machine learning model execution service that implements aspects of the present disclosure.

Generally described, aspects of the present disclosure relate to computer vision. More specifically, aspects of the present disclosure are directed to systems, methods, and computer-readable media related to a computer vision model execution service. A machine learning model, as used herein, may be generally defined as a computing model whose performance with regard to a particular task (or tasks) is improved through usage, rather than being improved by explicit programming. A computer vision machine learning model may further be described as a machine learning model that processes images or other visual data.

A computer vision machine learning model may accept a number of inputs, which are collectively referred to as an input vector. The input vector may include information regarding an image. For example, the input vector may include a digital image file in a format such as JPEG, PNG, GIF, RAW, TIFF, BMP, and the like. Alternatively, in some embodiments, the input vector may contain a uniform resource locator ("URL") that provides the location of a digital image file. The input vector may further include other information pertaining to the image or to an item depicted in the image. For example, the input vector may include information such as a name, description, location, category, catalog number, price, weight, size, or other data.

The computer vision machine learning model may further provide a number of outputs, which are collectively referred to as an output vector. The output vector may include scores or other values that are determined by the machine learning model with regard to a specified input vector. For example, a particular machine learning model may analyze images to determine the boundaries of an object in the foreground. The model may thus accept an input vector including an image and information regarding an image capture device (e.g., a focal length and shutter speed), and may provide an output vector that includes an estimate of the bounds of the foreground object and a confidence level in the estimation. It will be understood that computer vision machine learning models may utilize any number of techniques to produce an output vector from the input vector, and that the input and output vectors may vary widely from one model to the next. It will further be understood that a machine learning model need not "learn" from each new input vector, and that a model may be invoked to apply previous learnings rather than for purposes of improving the model.

Computer vision machine learning models may thus vary in purpose and application, and these variations may interfere with usage of the models. A user of computer vision models may be unaware of the input vector requirements for a particular model, or even unaware of the existence of a particular model or set of models that would suit the user's purpose. A user may thus be unable to make efficient and effective use of computer vision models, which may limit the functionality of the computer system and prevent efficient usage of computer vision models.

To overcome these difficulties, a computer vision model execution service may be implemented in accordance with aspects of the present disclosure. Illustratively, the computer vision model execution service may provide an interface, such as an application programming interface ("API"), that enables users to obtain listings of available models, their required input vectors, and their provided output vectors. In some embodiments, the API may further enable users to obtain descriptions of the available models, allowing a user to further assess whether a model would be suitable for a given purpose. The information provided with regard to a particular model may be collectively described as a "schema" for the model.

The computer vision model execution service may further provide an API or other interface for invoking one or more of the available models in accordance with their schemas. For example, the service may provide an API call that requires a model identifier and the identified model's input vector as input, and that in turn provides the model's output vector as output. In some embodiments, the service may provide an API that allows a user to specify multiple models and a workflow for executing them, such that models may be executed in a particular order (and/or in parallel), and such that all or part of the output vector(s) for one or more models may be provided as the input vector(s) to another one or more models.

The computer vision model execution service may further provide an interface for adding, modifying, and/or removing the available computer vision machine learning models. Illustratively, the service may provide an API call that allows a modeler, who has created a machine learning model, to make that model available through the execution service. In some embodiments, the execution service may provide feedback to the modeler regarding the usage and/or the accuracy of a model made available via the service. For example, the execution service may generate a report of how often (and by whom) a particular model is utilized. In further embodiments, the computer vision model execution service may support versioning or other processes for managing updates and modifications to existing models.

The computer vision model execution service may further determine a workflow for executing computer vision machine learning models in order to produce a desired output vector and/or apply a desired set of models to an input vector. As described in more detail below, the service may, in various embodiments, identify dependencies between models, determine an order of execution for models, or identify a set of models to execute in order to generate a desired output vector.

By providing a standardized interface for executing computer vision machine learning models, and by determining workflows that produce desired output vectors, the computer vision model execution service improves the functionality of the computing system, enables more efficient utilization of computing resources, and solves a technical problem that arises in the context of computing systems and networks.

FIG. 1A is an illustrative state diagram that depicts a client computing device 110 interacting with a computer vision model execution service 150 that implements aspects of the present disclosure. In the illustrated embodiment, the client computing device 110 may obtain an image 102, and at (1) may query the request management module 152 of the computer vision model execution service 150 for a list of available models 156A-C that are operable to process the image. Illustratively, the models 156A-C may be stored in a data store, such as the model data store 158. The model data store 158 may further store schemas, manifests, or other information pertaining to the models 156A-C. As illustrated, the individual models 156A, 156B, and 156C may have different characteristics. For example, the model 156A may be trained to recognize vehicles, the model 156B may be trained to recognize foreground objects, and the model 156C may be trained to recognize items in a grocery store.

At (2), the request management module 152 may provide information regarding the available models 154A-C. Illustratively, the request management module 152 may provide input vectors and/or output vectors for the models 154A-C, as described in more detail with reference to FIG. 3A.

At (3), the client computing device 110 may request that the computer vision model execution service 150 execute one or more of the models 154A-C, and may provide one or more input vectors in the formats required by the requested models 154A-C. For example, the client computing device 110 may request that the service 150 execute model 156B, and may provide an input vector for model 156B. As described with reference to FIG. 3A, the input vector may include the image 102 and associated metadata. The client computing device 110 may further request that the service 150 generate an input vector for the model 156C based on the output vector of the model 156B and/or the information provided in the request, and then execute the model 156C and provide the output vector. In some embodiments, the request from the computing device 110 may include all or part of multiple input vectors, and may request that the computer vision model execution service 150 provide all or part of one or more output vectors.

At (4), the request management module 152 may determine a workflow for executing the computer vision machine learning models 156A-C, and then may execute one or more of the models 156A-C in accordance with the workflow. As described in more detail below, the request management module 152 may determine a workflow that specifies an order of execution based on the input and output vectors of the models 156A-C. In some embodiments, the models 156A-C may be composite models, which may themselves define all or part of a workflow. For example, a model 156C may be comprised of models 156D, 156E, and 156F (not depicted in FIG. 1A), and may specify that the input vector of model 156F requires the output vectors of models 156D and 156E.

At (5), the request management module 152 may transmit the resulting output vector(s) to the client computing device 110, which may perform further processing on the output vector(s) as needed. For example, the input vector to the model 156B may be the image 102, and the output vector of the model 156B may be a shape of an identified foreground object (e.g., a region of the image 102) and a color of the foreground object (e.g., "red"). The input vector to the model 156C, in turn, may be the image 102 and the output vector of the model 156B, and the resulting output vector of the model 156C may be a product code for a grocery store item (e.g., an item code associated with an apple and/or the "Red Delicious" variety of apple). In some embodiments, the request at (3) may include only a single model, and the workflow may be omitted. In other embodiments, the workflow between models may be predefined and/or determined by the request management module 152 based on the input vector or other information.

Figure 1B:
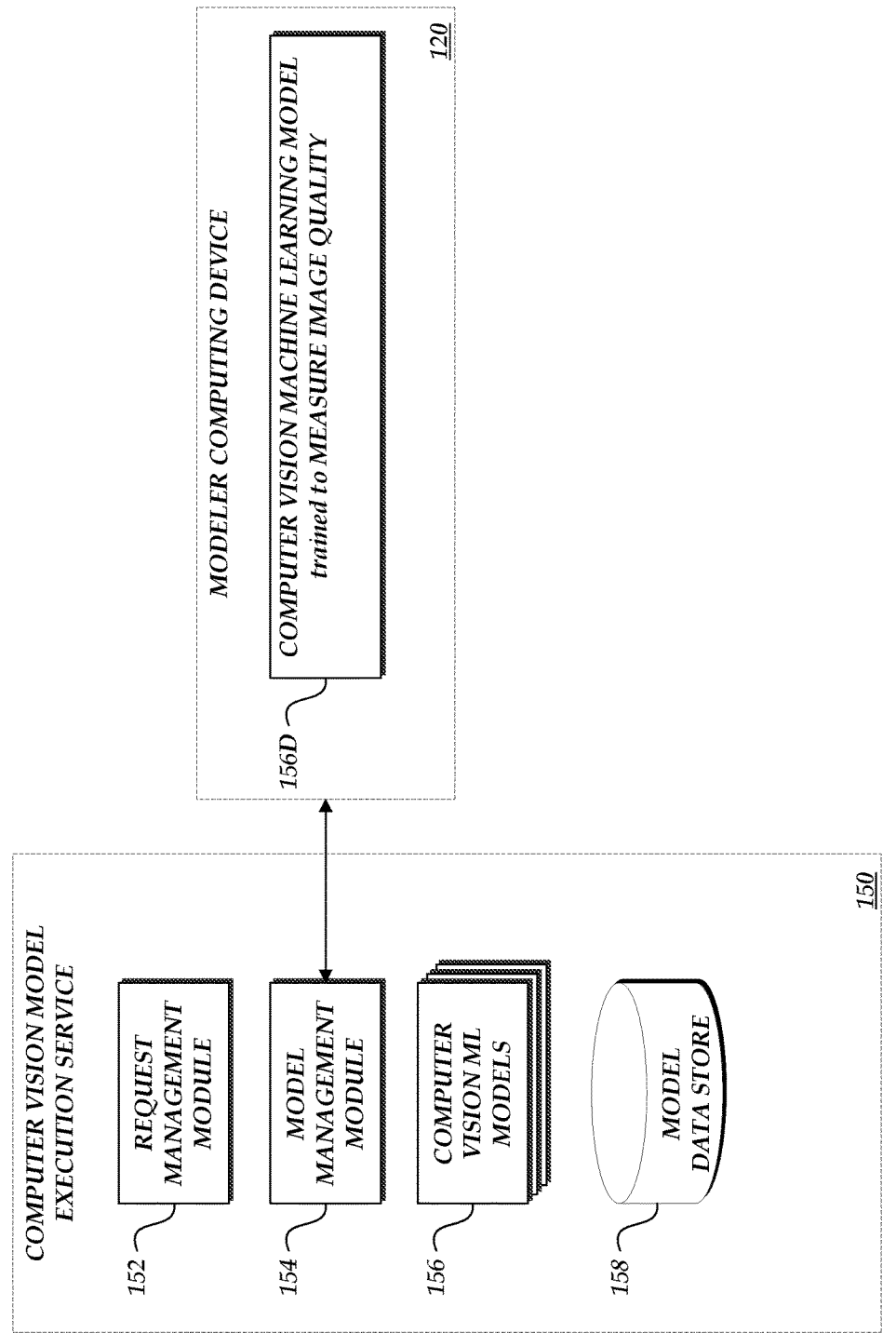
FIG. 1B is a schematic block diagram that depicts a modeler computing device interacting with a computer vision machine learning model execution service that implements aspects of the present disclosure.

FIG. 1B is a schematic block diagram that depicts a modeler computing device 120 interacting with the computer vision model execution service 150 to add a new model 156D to the set of available models 156. Illustratively, the model 156D, which has been trained to measure image quality, takes an image (such as image 102 of FIG. 1A) as an input vector and provides a score (e.g., a number on a scale of 1 to 10) as an output vector. The modeler computing device 120 may interact with the model management module 154 of the computer vision model execution service 150, which may provide an API or other interface enabling the addition, deletion, and modification of models 156. In some embodiments, the modeler computing device 120 may provide an identifier, version number, or other metadata regarding the model 156D. In other embodiments, the model management module 154 may generate and provide the identifier or other metadata. In further embodiments, the model management module 154 may verify that the modeler computing device 120 is authorized to create, modify, and/or delete the model 156D before processing a request to do so.

Figure 2:
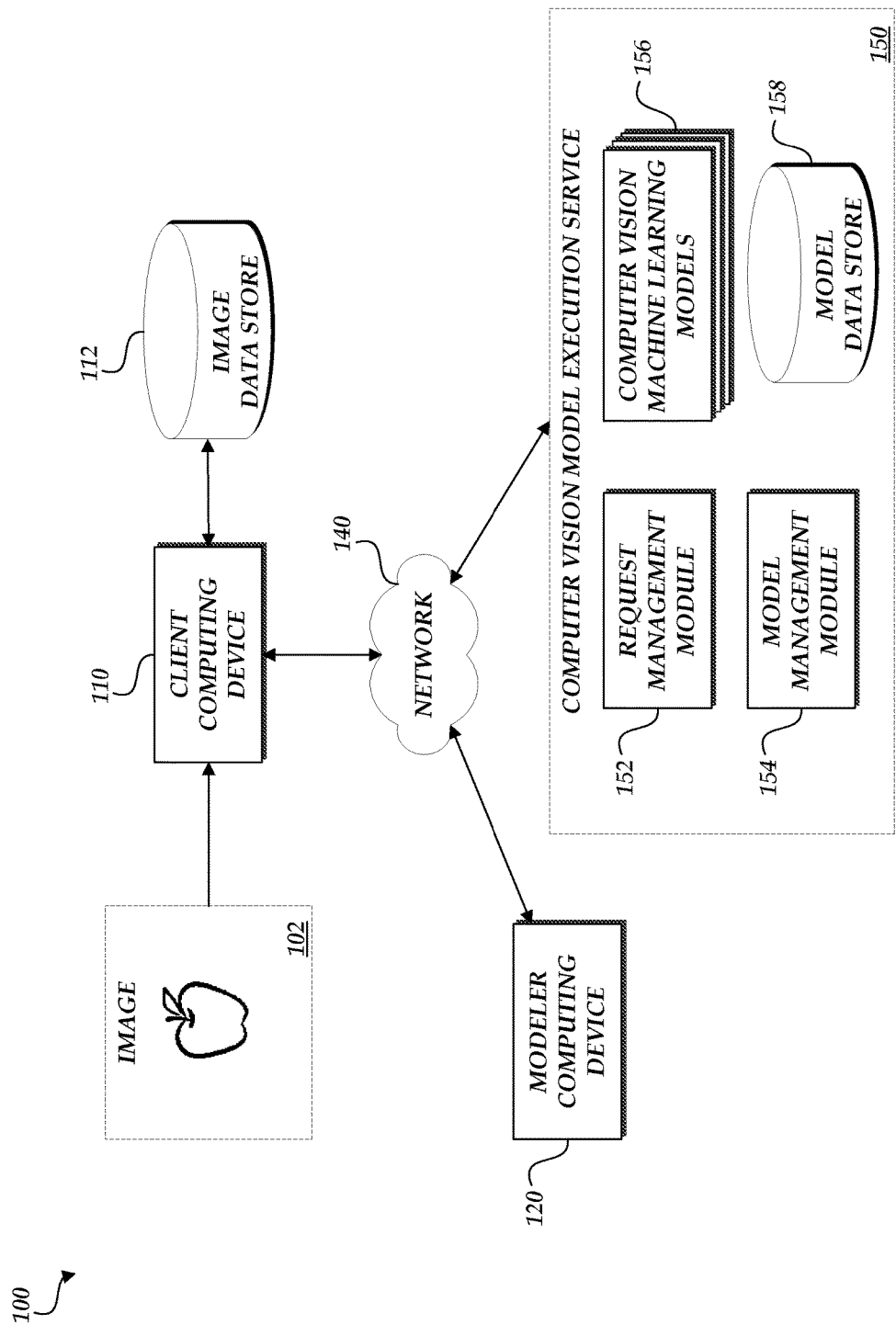
FIG. 2 is block diagram of an illustrative network topology including a client computing device, modeler computing device, and a computer vision model execution service communicating via a network.

FIG. 2 is an illustrative network topology depicting the client computing device 110, modeler computing device 120, and computer vision model execution service 150 communicating via a network 140. Illustratively, the network 140 may be any wired or wireless network, including but not limited to a local area network (LAN), wide area network (WAN), mesh network, cellular telecommunications network, the Internet, or any other public or private communications network or networks. In some embodiments, the client computing device 110 and the modeler computing device 120 may communicate with the computer vision model execution service 150 via different networks 140.

The client computing device 110 may illustratively be any computing device that is configured to implement aspects of the present disclosure. Examples of a client computing device 110 include, but are not limited to, a desktop computer, laptop, tablet, smartphone, wearable device, e-book reader, media playback device, component of a media device or appliance, or other computing device.

The client computing device 110 may obtain an image 102, which as described above may comprise a digital image file. The client computing device 110 may communicate the image 102 via the network 140 to the computer vision model execution service 150. In some embodiments, the client computing device 110 may obtain the image 102 via an image capture device (e.g., a camera) coupled to the client computing device 110. In other embodiments, the image 102 may be obtained from a data store, such as the image data store 112. In further embodiments, the image 102 may be obtained via the network 140.

The modeler computing device 120 may similarly be any computing device configured to implement aspects of the present disclosure, as described above. In some embodiments, the modeler computing device 120 and the client computing device 110 may be the same device.

The computer vision model execution service 150 is described in more detail below with reference to FIG. 5, and may include components such as a request management module 152, a model management module 154, one or more computer vision machine learning models 156, and a model data store 158. The computer vision model execution service 150 may include more or fewer components than those depicted in FIG. 2. In some embodiments, functions or components of the computer vision model execution service 150 may be implemented across multiple computing devices. For example, the model data store 158 may be external to the computer vision model execution service 150. In further embodiments, the network 140 may be omitted from and the modeler computing device 120 and/or the client computing device 110 may communicate directly with the computer vision model execution service 150.

FIG. 3A is a block diagram of an illustrative computer vision machine learning model 156D. The model 156D includes a model identifier 160, an input vector specification 170, and an output vector specification 180, which may be collectively referred to as the schema of the model 156D. The model identifier 160 may illustratively be any code that identifies a particular model within a set of models, such as the models 156 of FIG. 1B. In various embodiments, the model identifier 160 may include a version number, timestamp, source identifier, or other metadata pertaining to the model. In other embodiments, the metadata may be distinct from the model identifier 160.

The input vector specification 170 specifies the inputs required by the model 156D. In the illustrated embodiment, each input specification 172A-D comprises a name, a type, and one or more validation criteria pertaining to the input. For example, the input specification 172B comprises the name "Description," the type "text," and the validation criteria "text/plain" and "charset=utf-8." In some embodiments, the input vector specification 170 may further comprise, for example, an indication of whether inputs are required or optional, a default value for some or all inputs, a model from which the input(s) are obtained, or other specifications. For example, the input vector specification 170 may specify that the "title" input is obtained from the output vector of another model (e.g., by specifying the model identifier 160 of the other model).

The output vector specification 180 similarly identifies the output specifications 182A-C for the model 156D. Illustratively, the output vector specification 180 indicates that the model 156D provides a "style" output, a "category" output, and an "approval probability" output, which may indicate a likelihood that the image in the input vector will meet a set of approval criteria. The output vector specification 180 further indicates that the outputs are each of type "enumerated," and provides a function or expression that may be used to validate each output. In some embodiments, the output vector specification 180 may identify additional information that the model 156D provides for each output.

It will be understood that the input vector specification 170 is distinct from the input vector itself, and that the individual input specifications 172A-D are similarly distinct from the actual inputs to the model 156D. In some embodiments, the input vector corresponding to the specification 170 may comprise a series of name-value pairs, e.g.:
"Title": "Push Mower",
"Description": "A manually powered lawnmower.",
"Price": 79.95,
"Image" [image data in PNG format]
As a further example, the input vector may simply comprise a series of values, such as {"Push Mower", "A manually powered lawnmower.", 79.95, [image data in PNG format]}, that are provided according to the order specified by the input vector specification 170. Similarly, it will be understood that the output vector specification 180 is distinct from the output vector itself, and that the individual output specifications 182A-C are distinct from the outputs of the model 156D.

Figure 3B:
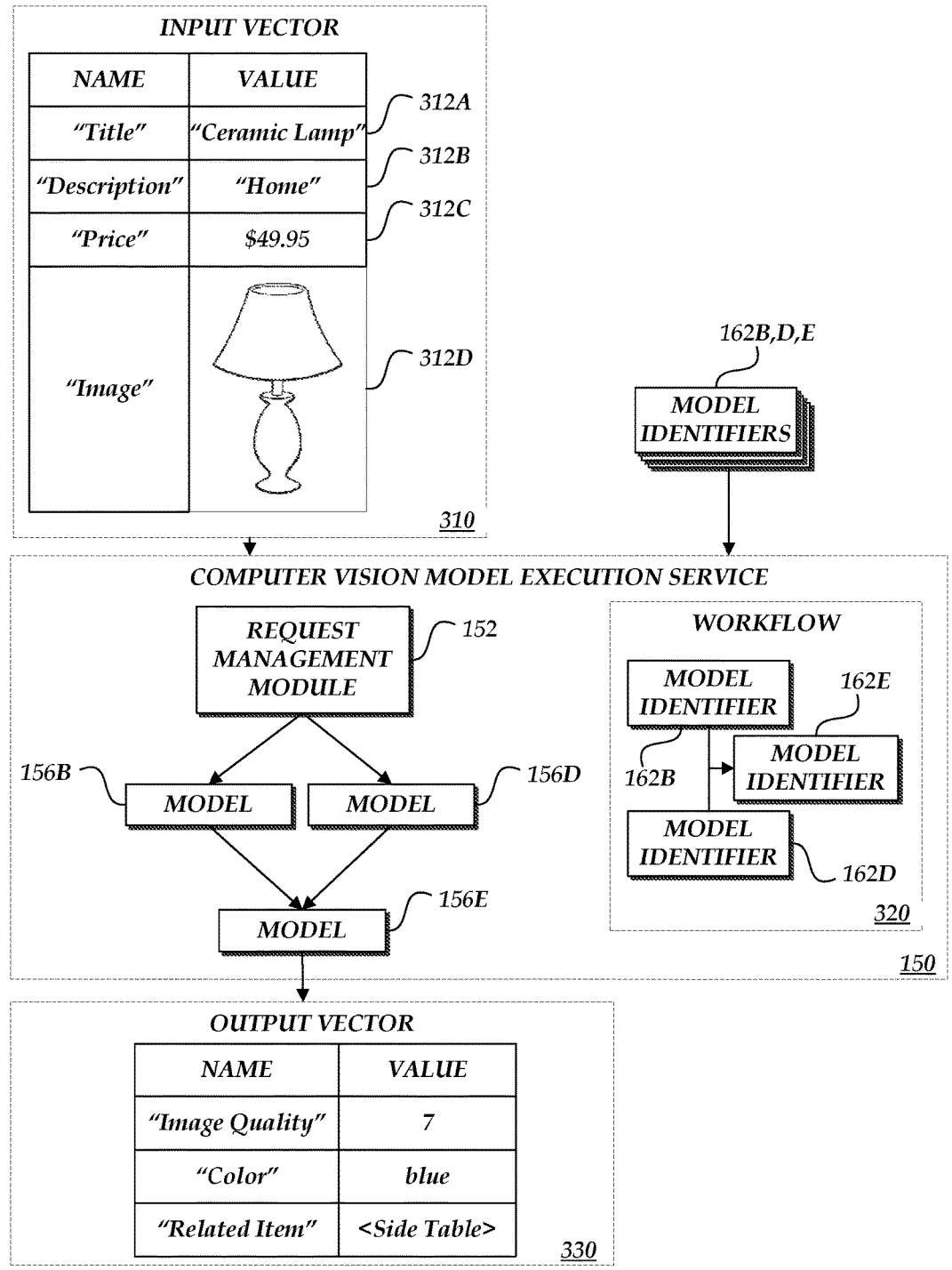
FIG. 3B is a block diagram of an illustrative computer vision model execution service receiving an input vector, executing a number of machine learning models, and providing an output vector in accordance with aspects of the present disclosure.

FIG. 3B is an illustrative drawing that further illustrates the inputs and outputs to the computer vision model execution service 150. In the illustrated embodiment, an input vector 310 and model identifiers 162B, 162D, and 162E are transmitted to the request management module 152 of the service 150. As described in detail with reference to FIG. 3A, the input vector 310 includes a series of name-value pairs 312A-D, each of which comprises a name and a value corresponding to an input specification 172A-D for the model 156D.

The computer vision model execution service 150 may determine a workflow 320, which illustratively specifies that the input vector 310 will be provided to the models 156 and 156 identified by model identifiers 162B and 162D, and that the output vectors of models 156 and 156 will be provided as an input vector to model 156 (which is identified by model identifier 162E). In some embodiments, the workflow 320 may specify a mapping of inputs 312A-D and/or individual outputs into input vectors for the respective models 156B, 156D, and 156E. In further embodiments, multiple input vectors 310 may be provided. Illustratively, the input vector(s) 310 and the workflow 320 may be transmitted to the computer vision model execution service 150 by a computing device, such as the client computing device 110 of FIG. 1A.

The computer vision model execution service 150 may process the workflow 320 and input vector(s) 310 to determine a sequence of execution for the models 156B, 156D, and 156E identified by the model identifiers 162B, 162D, and 162E. The models may be executed in series, in parallel, or both in series and in parallel, as in the illustrated embodiment. The service 150 may, in some embodiments, determine and generate input vectors for the models 156B, 156D, and 156E based on the input vector(s) 310 and the workflow. In some embodiments, the input vector 310 may not correspond to a particular model, and may instead comprise all or part of the input vectors of multiple models.

The computer vision model execution service 150 may thus produce and output an output vector 330, which in the illustrated embodiment corresponds to the output vector of the model 156E. In some embodiments, the service 150 may output multiple output vectors 330, or may output a composite output vector 330 comprising individual outputs from multiple models.

Figure 4A:
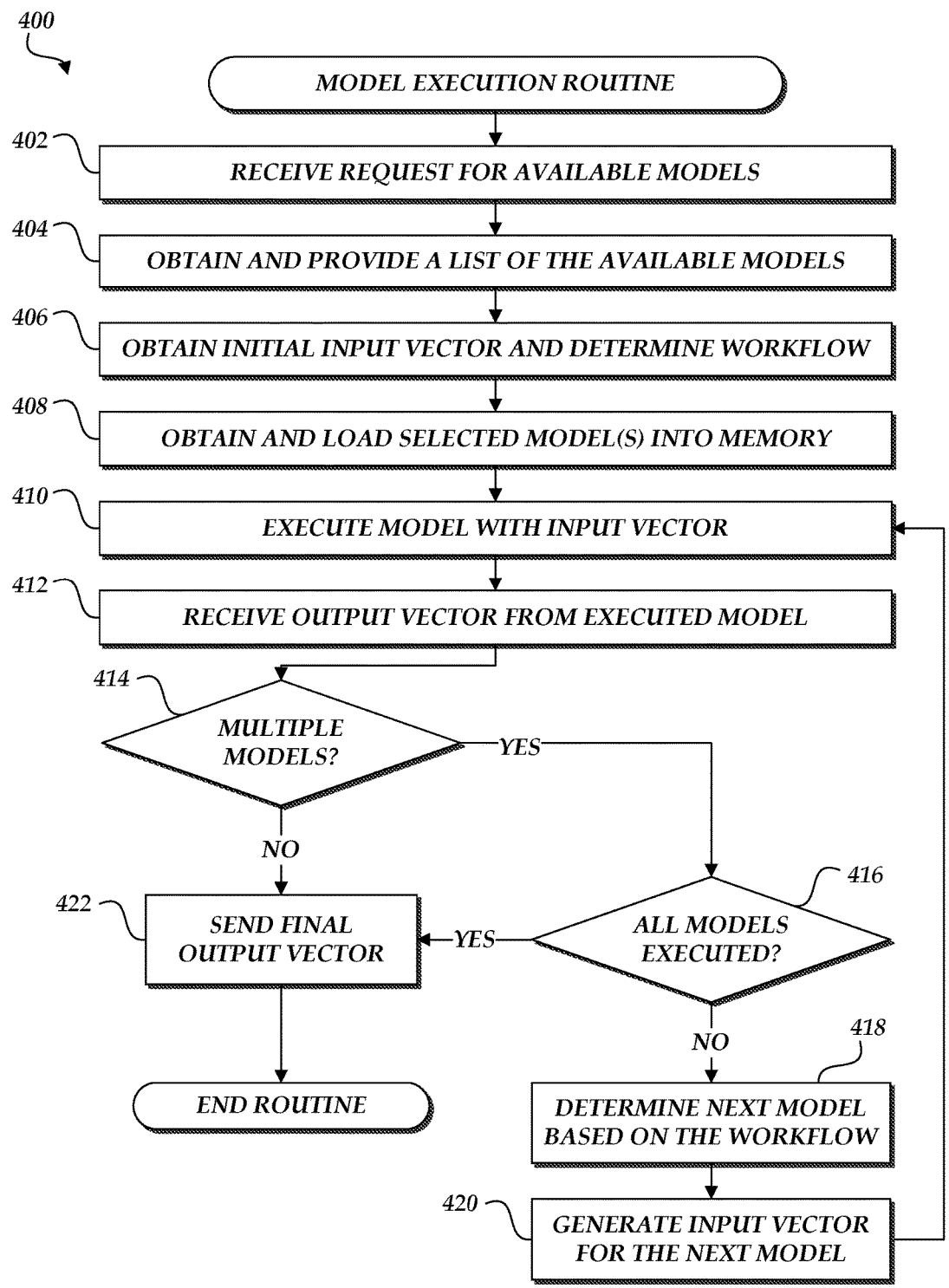
FIG. 4A is a flow diagram depicting an illustrative routine for executing a computer vision machine learning model or models in accordance with aspects of the present disclosure.

FIG. 4A is a flow diagram depicting an illustrative model execution routine 400. The routine 400 may be carried out, for example, by the computer vision model execution service 150 of FIG. 1A. At block 402, a request for a listing of available models may be received. Illustratively, the request may be received from a computing device, such as the client computing device 110 of FIG. 1A. At block 404, a list of the available models may be obtained (illustratively from a data store, such as the model data store 158 of FIG. 1A) and provided in response to the request. Illustratively, in some embodiments, blocks 402 and 404 may be omitted or may be carried out separately from the remainder of the routine 400.

At block 406, a request may be received that specifies at least one input vector and identifies a number of models, as described in detail above. In some embodiments, a list of models may be specified in the request, and a workflow may be determined based on the list. For example, a first model may specify that its input vector requires the output of a second model, which in turn specifies that its input vector requires the output of a third model. A workflow may thus be determined based on the dependencies between the models, and the determined workflow may indicate that the third model be executed first, followed by the second model, and then the first model. In further embodiments, a request may be received that provides an input vector and a desired output vector, and a workflow may be determined that generates the desired output vector. For example, a request may provide an input vector that corresponds to the input vector of model 156A, and may provide a desired output vector that corresponds to the outputs of models 156C and 156E. A workflow may be determined that identifies model 156B as an intermediate step (e.g., it may be determined that the input vector of model 156E requires an output from the output vector of model 156B), and a workflow may be generated that specifies execution of models 156A, 156B, 156C, and 156E in a sequence that leads to the desired output vector. In still further embodiments, a workflow may be determined by and obtained from a workflow determination routine, such as the routine 450 described below with reference to FIG. 4B.

At block 408, the models identified by the workflow may be obtained (e.g., from a data store) and loaded into memory. Thereafter, at block 410, a model may be executed in accordance with the workflow and using the initial input vector provided at block 406. In some embodiments, the model executed at block 410 may be a composite model, which contains a number of models and may contain a workflow for executing them. In further embodiments, one or more models in a composite model may also be composite models, and the routine 400 may be carried out recursively.

At block 412, an output vector may be received as a result of executing the model. At decision block 414, a determination may be made as to whether the workflow included more than one model. If not, then at block 422 the output vector obtained at block 412 may be transmitted to the source of the request, and the routine 400 ends.

If the determination at decision block 414 is that the workflow includes multiple models, then at decision block 416 a determination is made as to whether all models in the workflow have been executed. If so, then the most recently generated output vector may be output at block 422. If not, then at block 418 the next model to execute and the corresponding input vector may be determined based on the workflow. For example, it may be determined that a model that had dependencies on other models is now ready to be executed, and a suitable input vector may be generated based on one or more output vectors previously generated by the routine 400. In some embodiments, the workflow may be expressed as a collection of dependencies. For example, the determination may be that all of the required inputs for models 156B and 156D are available, but that model 156E requires outputs from model 156D in its input vector, and model 156D has not yet been executed. The routine 400 may thus determine that model 156D should be executed next, and may generate the input vector for model 156D from the available model inputs.

In some embodiments, block 412 may be omitted, models may be executed in parallel, and a determination may be made at block 418 as to whether an input vector can be generated for any model in the workflow that is not currently executing. In further embodiments, a critical path through the workflow may be identified, and execution of models may be prioritized accordingly. For example, an estimated duration of execution may be determined for each model, and an order of execution for the models may be determined that minimizes the total duration (e.g., by starting execution as soon as possible for models with a long duration of execution).

At block 420, an input vector may be generated for the model determined at block 418. Illustratively, the input vector may be generated from the output vector(s) of models that have completed execution, from the initial input vector, or from a combination thereof. The routine 400 then continues at block 410, where the model determined at block 418 is executed with the input vector generated at block 420, and the routine 400 then iterates until all models specified by the workflow have been executed.

Figure 4B:
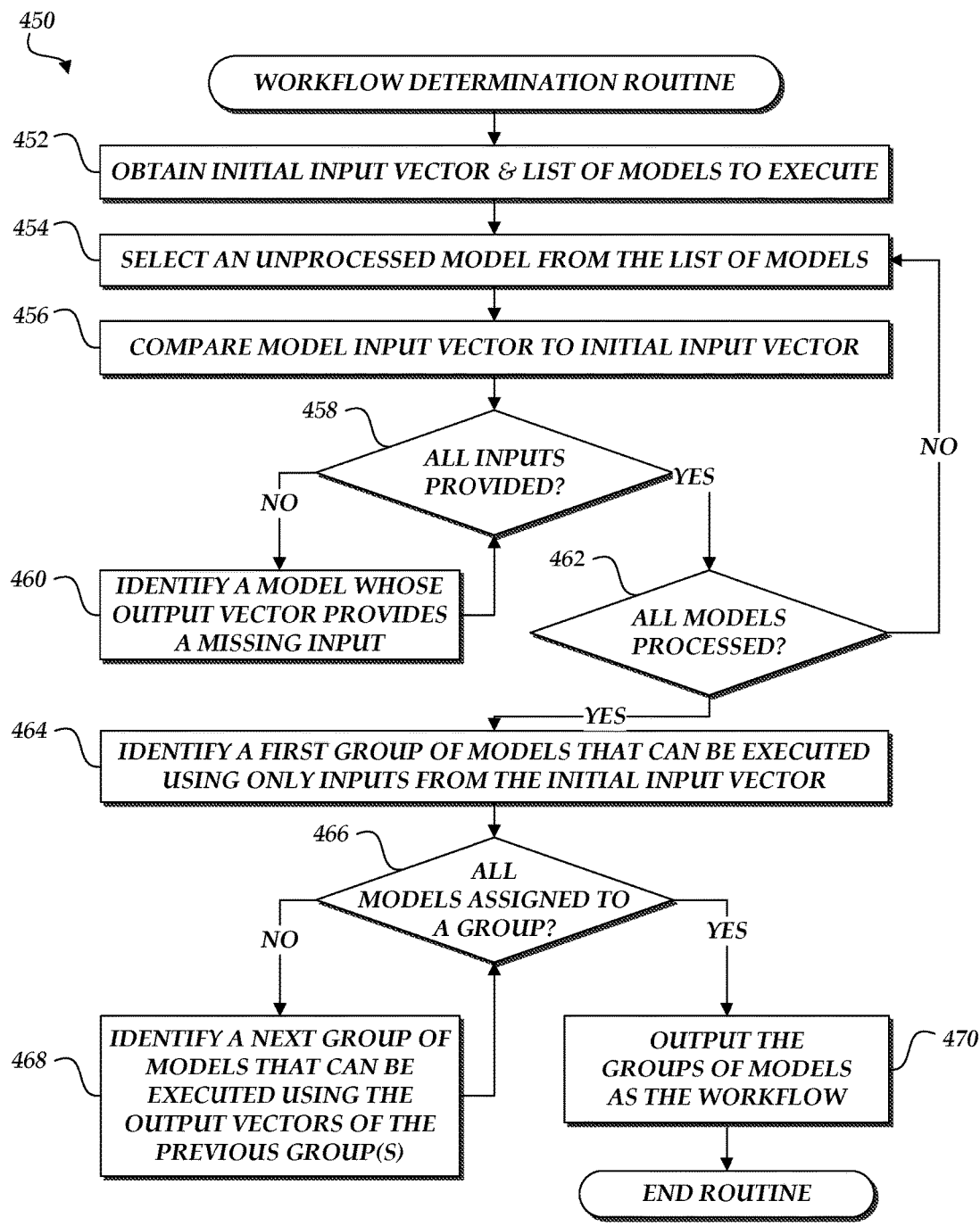
FIG. 4B is a flow diagram depicting an illustrative routine for determining a workflow for executing computer vision machine learning models in accordance with aspects of the present disclosure.

FIG. 4B is a flow diagram depicting an illustrative workflow determination routine 450. The routine 450 may be carried out, for example, by the computer vision model execution service 150 of FIG. 1A. At block 452, an initial input vector and a list of models to execute may be obtained. In some embodiments, an initial input vector and a desired output vector may be obtained, and the routine 450 may determine an initial list of models to execute by obtaining a list of available models and identifying models whose output vectors may be used or combined to generate the desired output vector.

At block 454, an unprocessed model may be selected from the list of models. At block 456, the input vector of the unprocessed model may be compared to the initial input vector obtained at block 452, and any inputs that are required but not provided may be identified.

At decision block 458, a determination may be made as to whether all of the inputs required by the unprocessed model are provided. If not, then at block 460 a gap-filling model may be identified whose output vector provides at least one of the missing inputs. The unprocessed model may thus be described as having a dependency on the gap-filling model, in that it requires the output of the gap-filling model before it can be executed. In embodiments where a desired output vector is provided at block 452, the gap-filling model may be added to the list of models to execute. The routine 450 then returns to decision block 458 and re-assesses whether all of the inputs required by the unprocessed model are provided. If not, then a second gap-filling model may be identified, and the routine 450 may iterate until all of the inputs required by the unprocessed model are provided. In some embodiments, the routine 450 may detect that it does not have a model that provides the missing input (e.g., by iterating through all of the models on the list, or through all of the available models), and may therefore output an error message and exit the routine 450.

If the determination at block 458 is that all of the inputs for the unprocessed model have been provided, then at decision block 462 a determination may be made as to whether all of the models in the list of models have been processed. If not, then the routine 450 branches to block 454, selects another unprocessed model, and iterates until all models have been processed. If all of the models have been processed, then the routine 450 branches to block 464, where a first group of models that can be executed using only the initial input vector may be identified. Illustratively, the first group of models may include any model that did not require block 460 to be carried out during its processing. In other words, the first group may include any model whose inputs can be satisfied by the initial input vector alone.

At decision block 466, a determination may be made as to whether all of the models on the list of models to be executed have been assigned to a group. If all of the models can be executed using the initial input vector only, then at block 470 the first group of models may be output as the workflow. In some embodiments, the workflow may indicate that models within a group may be executed in any order and/or in parallel. In other embodiments, the workflow may determine a sequential order of execution for models that are not dependent on each other, based on factors such as estimated durations of model execution, available computing resources, or other criteria.

If the determination at decision block 466 is that the first group does not include all of the models to be executed (e.g., that some of the models have dependencies on other models), then at block 468 a next group of models may be identified that can be executed using one or more output vectors of the first group and, in some embodiments, the initial input vector. For example, a model 165E may be identified that requires the output of models 156B and 156D, which were both in the first set of models. The model 165E may thus be identified as a member of the second group.

The routine 450 then returns to decision block 466, where a determination may be made as to whether all of the models to be executed have been assigned to either the first group or the second group. If not, then the routine 450 returns to block 468, identifies a third group of models (e.g., models having a dependency on a model in the second group), and iterates until all of the models have been assigned to a group. The routine 450 then branches to block 470, where the groups of models (and, in some embodiments, the mapping of dependencies between models) may be output as the workflow for executing the models.

In some embodiments, the workflow output at block 470 may be provided to a routine for executing the models, such as the model execution routine 400 described with reference to FIG. 4A. In other embodiments, the workflow or other information regarding the workflow may be provided in response to a query or other input at block 452. For example, a query may be made to determine whether a workflow exists that will produce a desired output vector given an available input vector, and the output may identify additional inputs that would be needed in order to generate a workflow using the available models. As further examples, the output at block 470 may include an estimated duration of the workflow, an estimate of computing resources needed to execute the workflow, or other information. In some embodiments, the routine 450 may identify multiple workflows that could produce an output vector, and may provide output that enables selection of a workflow.

Figure 5:
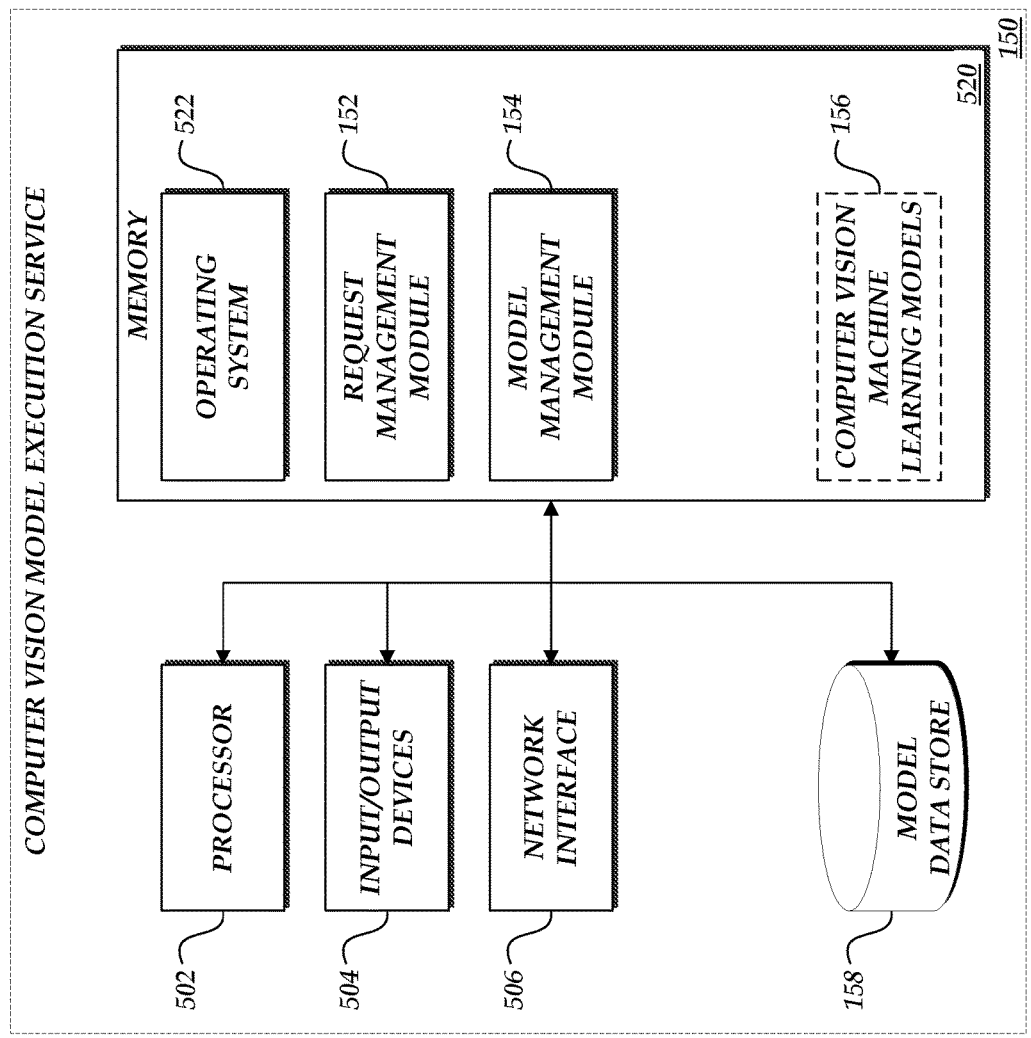
FIG. 5 is a block diagram depicting a general architecture of an example electronic device configured to implement aspects of the present disclosure.

FIG. 5 is a block diagram depicting a general architecture of an example computer vision model execution service 150, which includes an arrangement of computer hardware and software components that may be used to implement aspects of the present disclosure. The computer vision model execution service 150 may include many more (or fewer) elements than those shown in FIG. 5. It is not necessary, however, that all of these elements be shown in order to provide an enabling disclosure.

As illustrated, the computer vision model execution service 150 includes a processor 502, input/output devices 504, a network interface 506, and a model data store 158, all of which may communicate with one another by way of a communication bus. The network interface 506 may provide connectivity to one or more networks (such as network 140) or computing systems and, as a result, may enable the computer vision model execution service 150 to receive and send information and instructions from and to other computing systems or services, such as the client computing device 110 or the modeler computing device 120. In some embodiments, the computer vision model execution service 150 may be configured to process requests from the client computing device 110, such as requests to execute one or more computer vision machine learning models with a provided input vector, as described above.

The processor 502 may also communicate to and from a memory 520. The memory 520 may contain computer program instructions (grouped as modules or components in some embodiments) that the processor 502 may execute in order to implement one or more embodiments. The memory 520 generally includes RAM, ROM, and/or other persistent, auxiliary, or non-transitory computer-readable media. The memory 520 may store an operating system 522 that provides computer program instructions for use by the processor 502 in the general administration and operation of the electronic device 100. The memory 520 may further store specific computer-executable instructions and other information (which may be referred to herein as "modules") for implementing aspects of the present disclosure.

In some embodiments, the memory 520 may include a request management module 152, which may be executed by the processor 502 to perform various operations, such as those operations described with reference to FIGS. 4A and 4B. The memory 520 may further include a model management module 154, which may perform operations such as adding, deleting, or modifying models stored in the model data store 158. The memory 520 may still further include computer vision machine learning models 156 that are obtained from the model data store 158 and loaded into the memory 520 as various operations are performed. As used herein, a "data store" may be embodied in hard disk drives, solid state memories, and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service.

While the operating system 522, the request management module 152, and the model management module 154 are illustrated as distinct modules in the memory 520, in some embodiments, the request management module 152 and the model management module 154 may be incorporated as modules in the operating system 522 or another application or module, and as such, separate modules may not be required to implement some embodiments. In some embodiments, the request management module 152 and the model management module 154 may be implemented as parts of a single application.

The computer vision model execution service 150 may connect to one or more networks via the network interface 506. The network may be any wired or wireless network, including but not limited to a local area network (LAN), wide area network (WAN), mesh network, cellular telecommunications network, the Internet, or any other public or private communications network or networks. In some embodiments, the network interface 506 may utilize protocols such as WiFi, Bluetooth, LTE, GPRS, TCP/IP, UDP, Ethernet, or other protocols to communicate via the network(s).

It will be recognized that many of the components described in FIG. 5 are optional and that embodiments of computer vision model execution service 150 may or may not combine components. Furthermore, components need not be distinct or discrete. Components may also be reorganized. For example, computer vision model execution service 150 may be represented in a single physical device or, alternatively, may be split into multiple physical devices. In some embodiments, components illustrated as part of the computer vision model execution service 150 may additionally or alternatively be included in other computing devices, such that some aspects of the present disclosure may be performed by computer vision model execution service 150 while other aspects are performed by another computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

What is claimed is:

1. A system comprising:
   a data store configured to store computer-executable instructions; and
   a processor in communication with the data store, the processor configured to execute the computer-executable instructions to at least:
      obtain a plurality of computer vision machine learning models, wherein each computer vision machine learning model of the plurality of computer vision machine learning models comprises a model identifier, an input vector comprising one or more input values, and an output vector comprising one or more output values;
      receive, from a computing device, a request to process an image, the request to process the image comprising a first input vector and information identifying one or more computer vision machine learning models, the first input vector including at least image data corresponding to the image;
      determine a model execution workflow based at least in part on the first input vector and the information identifying one or more computer vision machine learning models, the model execution workflow including at least:
         executing a first computer vision machine learning model with the first input vector to obtain a first output vector;
         generating a second input vector based at least in part on the first output vector obtained by executing the first computer vision machine learning model, wherein the second input vector is distinct from the first input vector; and
         executing a second computer vision machine learning model with the second input vector to obtain a second output vector;
      implement the model execution workflow to obtain the second output vector; and
      transmit the second output vector to the computing device.

2. The system of claim 1, wherein the information identifying one or more models comprises a model identifier of the first computer vision machine learning model and a model identifier of the second computer vision machine learning model.

3. The system of claim 1, wherein the information identifying one or more computer vision machine learning models comprises the first input vector and a requested output vector, wherein the requested output vector corresponds to the second output vector.

4. The system of claim 3, wherein the processor is further configured to identify the first computer vision machine learning model based at least in part on the first input vector.

5. The system of claim 3, wherein the processor is further configured to:
   identify a first group of computer vision machine learning models, each computer vision machine learning model in the first group comprising an initial input vector and an intermediate output vector, wherein each initial input vector comprises one or more input values from the first input vector;
   identify a second group of computer vision machine learning models, wherein each model in the second group comprising an intermediate input vector and a final output vector, wherein each final output vector comprises one or more output values from the second output vector;
   determine that an intermediate output vector of a computer vision machine learning model in the first group corresponds to an intermediate input vector of a computer vision machine learning model in the second group;
   identify the computer vision machine learning model in the first group as the first computer vision machine learning model; and
   identify the computer vision machine learning model in the second group as the second computer vision machine learning model.

6. A computer-implemented method comprising:
   under control of a first computing device executing specific computer-executable instructions,
   obtaining a plurality of computer vision machine learning models, each computer vision machine learning model of the plurality of computer vision machine learning models comprising a model identifier, an input vector comprising an input value, and an output vector comprising an output value;
   receiving, from a second computing device, an initial input vector and a desired output vector;
   determining, based at least in part on the initial input vector and the desired output vector, a model execution workflow, wherein the model execution workflow identifies a subset of the plurality of computer vision machine learning models, wherein the model execution workflow specifies an order of execution for the subset wherein the model execution workflow includes a first computer vision machine learning model and a second computer vision machine learning model, and wherein an input vector of the second computer vision machine learning model is generated based at least in part on an output vector of the first computer vision machine learning model;

executing the computer vision machine learning models in the subset in accordance with the model execution workflow to generate the desired output vector from the initial input vector; and transmitting the desired output vector to the second computing device.

7. The computer-implemented method of claim 6, wherein the model execution workflow specifies parallel execution for at least a portion of the computer vision machine learning models in the subset.

8. The computer-implemented method of claim 6, wherein the initial input vector comprises at least one of information regarding an image or information regarding an item depicted in the image.

9. The computer-implemented method of claim 8, wherein the information regarding the image comprises at least one of image data, a uniform resource locator, a geographic location associated with the image, or information regarding an image capture device.

10. The computer-implemented method of claim 8, wherein the information regarding the item comprises at least one of a name, description, size, weight, price, category, or catalog number.

11. The computer-implemented method of claim 6, wherein determining the model execution workflow comprises at least:

identifying the first computer vision machine learning model from the plurality of computer vision machine learning models, wherein an input vector of the first computer vision machine learning model comprises at least a portion of the initial input vector;

identifying the second computer vision machine learning model from the plurality of computer vision machine learning models, wherein the input vector of the second computer vision machine learning model comprises at least a portion of the output vector of the first computer vision machine learning model;

determining that at least a portion of the desired output vector corresponds to an output vector of the second computer vision machine learning model; and adding the first computer vision machine learning model and the second computer vision machine learning model to the model execution workflow.

12. The computer-implemented method of claim 11, wherein the input vector of the second computer vision learning model further comprises at least a portion of the initial input vector.

13. The computer-implemented method of claim 6, wherein the initial input vector comprises a name-value pair.

14. The computer-implemented method of claim 6 further comprising:

receiving, from the computing device, a request for a listing of available computer vision machine learning models; and in response to the request, providing information regarding individual computer vision machine learning models in the plurality of computer vision machine learning models.

15. The computer-implemented method of claim 14, wherein the information regarding an individual computer vision machine learning model comprises the input vector of the individual computer vision machine learning model and the output vector of the individual computer vision machine learning model.

16. A non-transitory, computer-readable storage medium storing computer-executable instructions that, when executed by a computer system, configure the computer system to perform operations comprising:

receiving, from a computing device, a request comprising an initial input vector and a plurality of model identifiers;

obtaining a plurality of models that correspond to the request, each of the plurality of models comprising a model identifier, an input vector, and an output vector;

determining, based at least in part on the initial input vector and the plurality of models, a model execution workflow, wherein the model execution workflow includes a first model and a second model, and wherein an input vector of the second model is generated based at least in part on an output vector of the first model;

executing the plurality of models in accordance with the workflow to generate a final output vector; and transmitting the final output vector to the computing device.

17. The non-transitory, computer-readable storage medium of claim 16, wherein the plurality of models comprises the first model and the second model, and wherein determining the model execution workflow comprises determining that an input vector of the second model comprises at least part of an output vector of the first model.

18. The non-transitory, computer-readable storage medium of claim 17, wherein the plurality of models further comprises a third model, and wherein determining the model execution workflow further comprises determining that an input vector of the third model comprises at least part of the output vector of the second model.

19. The non-transitory, computer-readable storage medium of claim 18, wherein the final output vector includes an output vector of the third model.

20. The non-transitory, computer-readable storage medium of claim 18, wherein the model execution workflow is further determined based at least in part on an estimated duration of execution of at least one of the plurality of models.

* * * * *